April 2, 1935.  W. A. DARRAH  1,996,233
AUTOMATIC MEASURING APPARATUS
Filed May 26, 1930   4 Sheets-Sheet 1
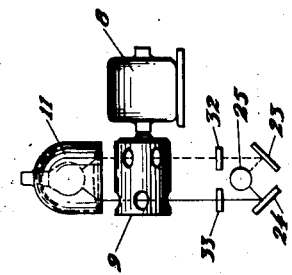
Fig. III.
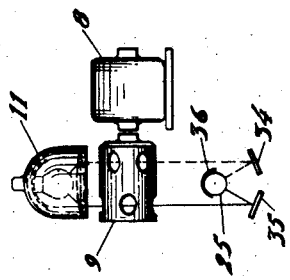
Fig. IV.
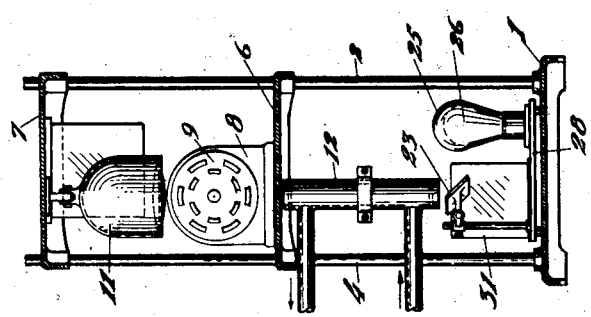
Fig. II.
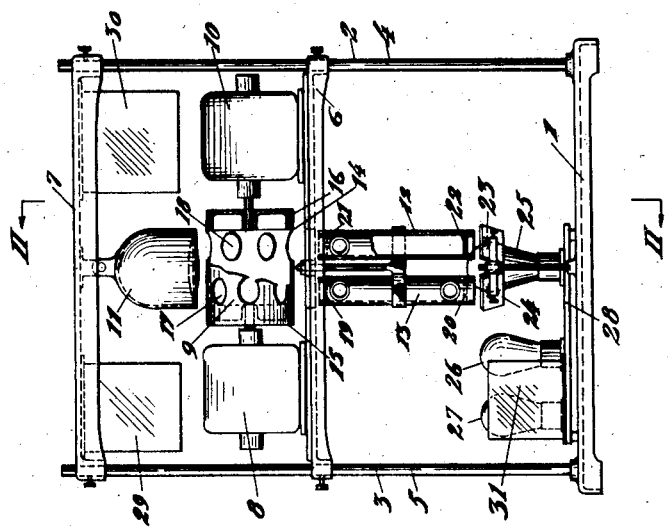
Fig. I.
Inventor:
William A. Darrah.

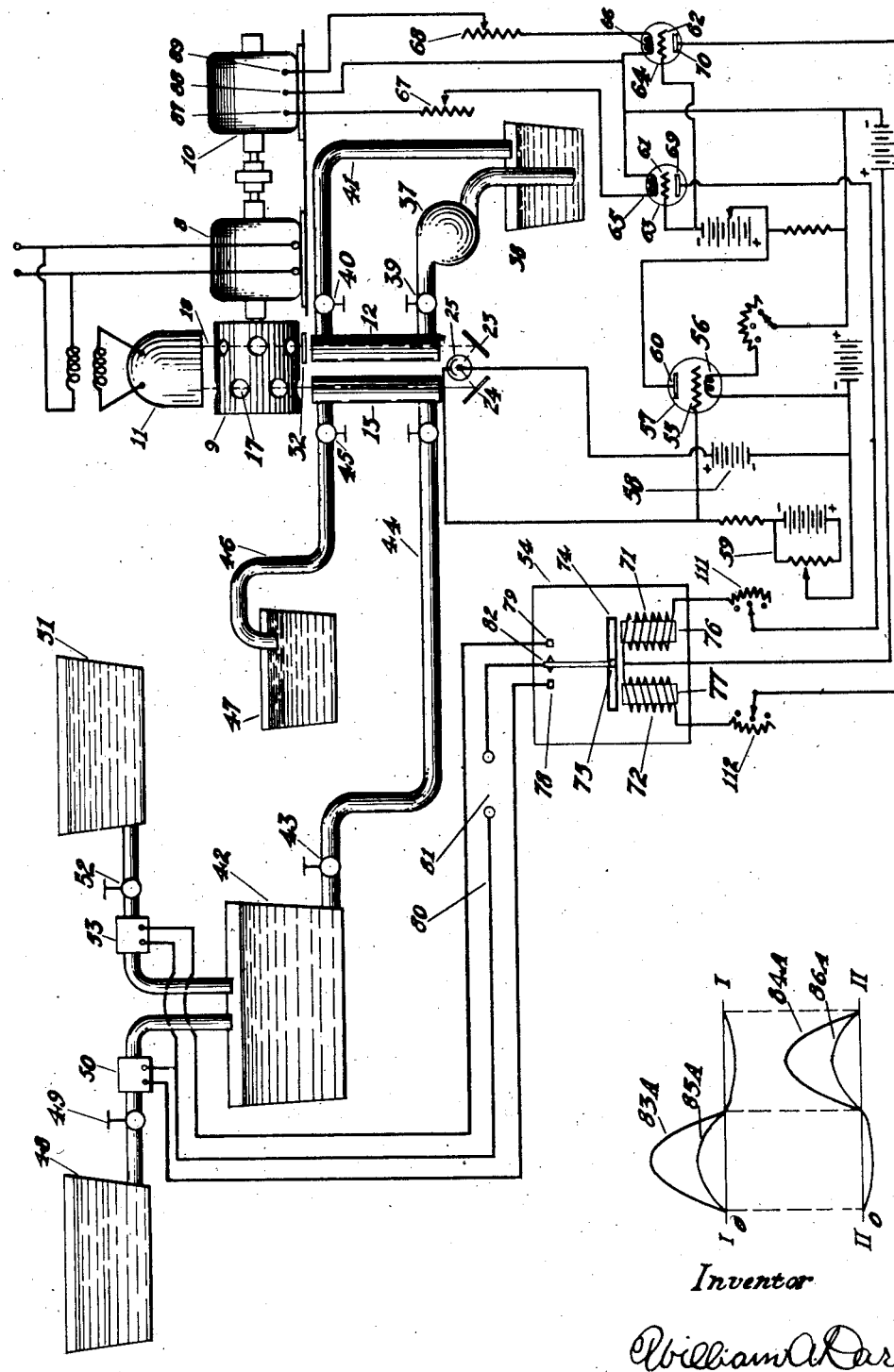

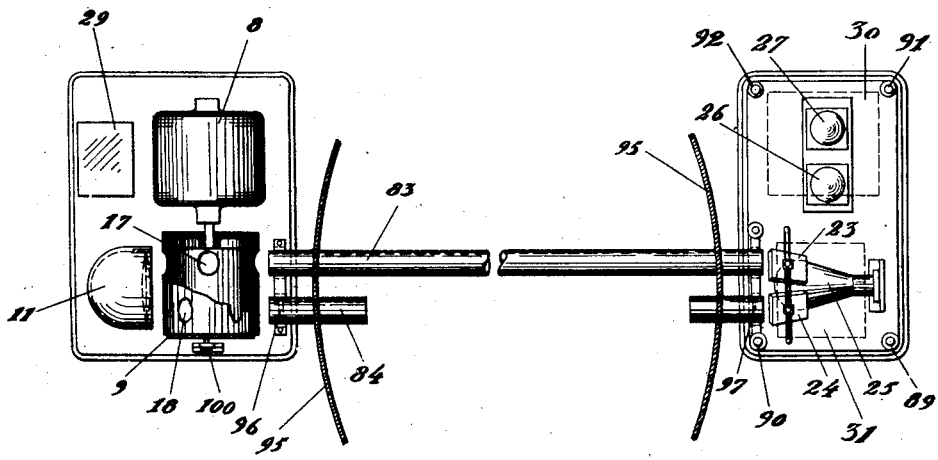
Fig. VII.
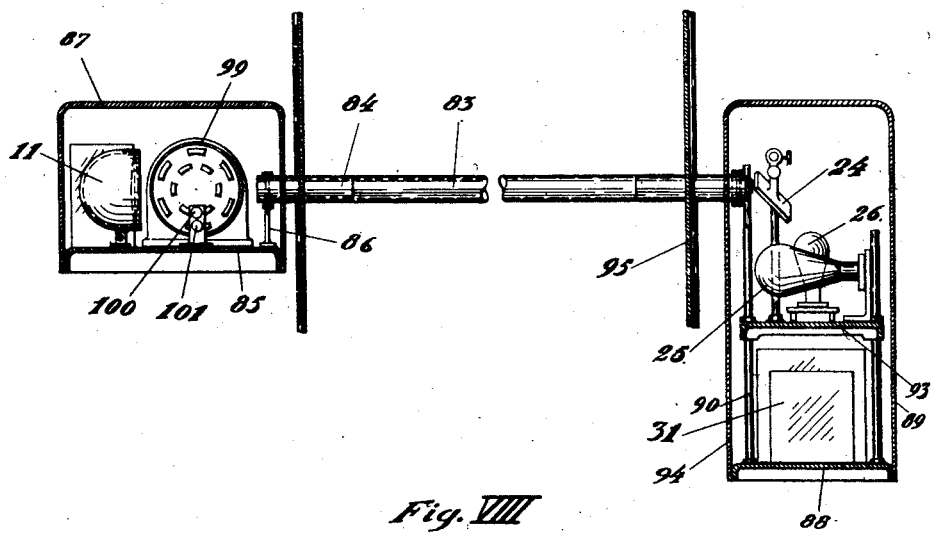
Fig. VIII

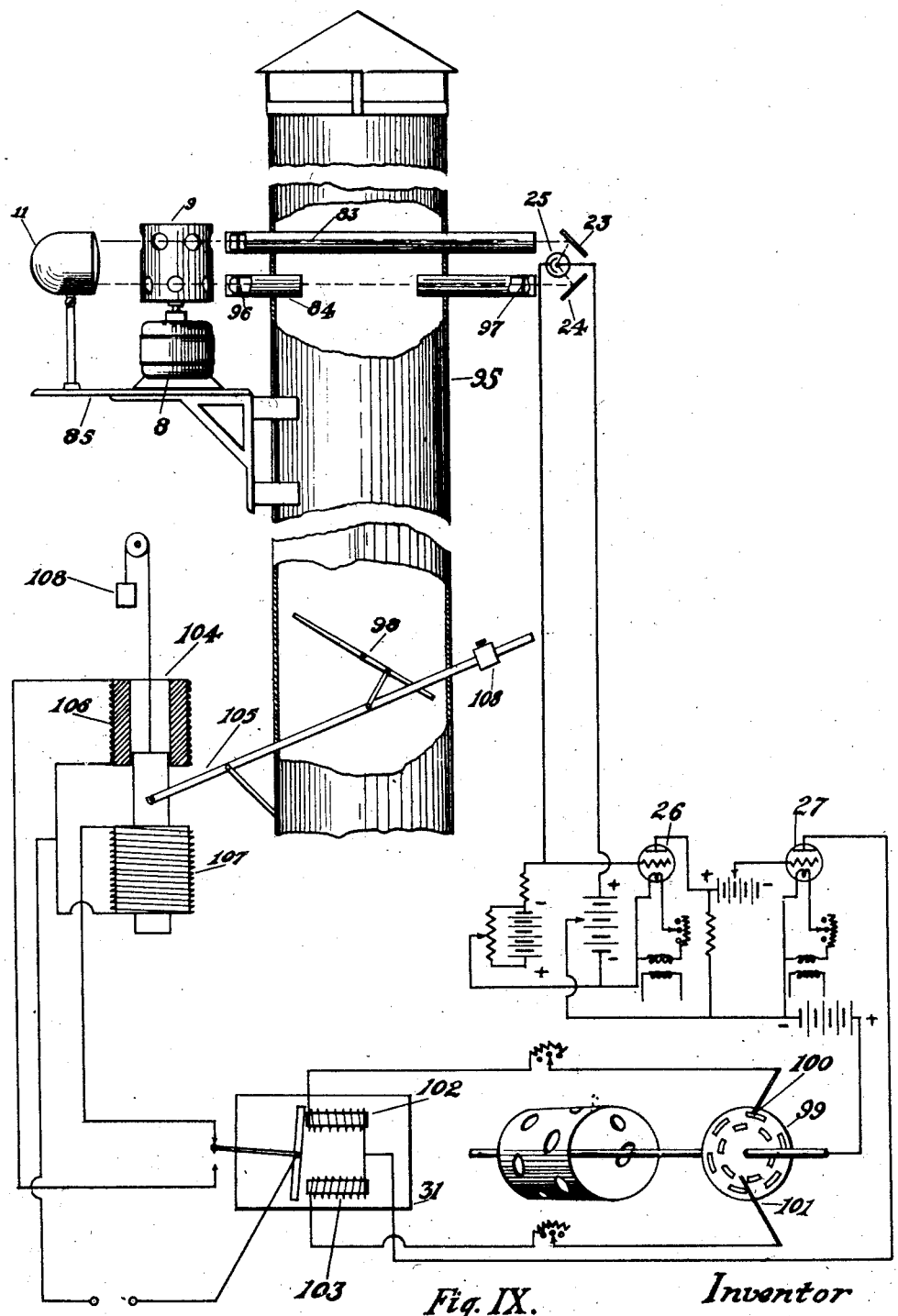
Fig. IX.

Patented Apr. 2, 1935

1,996,233

UNITED STATES PATENT OFFICE 1,996,233

AUTOMATIC MEASURING APPARATUS

William A. Darrah, Chicago, Ill.

Application May 26, 1930, Serial No. 455,684

3 Claims. (Cl. 250—41.5)

This invention relates to equipment and methods for automatically measuring differences in light transmission. Among the objects of this invention are to provide economical simple and quick responding means for controlling various processes and operations by means of the transparency or light reflection of certain products. Another object of this invention is to provide means for automatically eliminating certain variables which have hitherto been difficult to control. Other objects will be apparent from consideration of the drawings, specifications and claims attached hereto.

One application of this invention is in the control of combustion to record the presence of an excessive amount of smoke or to eliminate an excess of smoke by automatic control devices. Another possible application of this equipment is in the control of such operations as the burning of sulphur for the production of acid. In this operation the presence of unburned sulphur is highly objectionable. The excess of sulphur carried in suspension in the sulphur gases is of course visible as a smoke or cloud whereas the sulphur gases free from unconsumed sulphur are transparent.

Equipment of this class may also be used for such applications as a consistency regulation of stock in paper mills, the control of the opaqueness of solutions, as for example in the manufacture of sugar, dyes, oil varnishes, etc. The equipment may also be applied to the matching of colors in liquids, on textiles, fabrics, etc.

This invention provides means for controlling the various characteristics of materials entirely by the light transmission or reflection and eliminates such variables as change in quantity or quality of light source, deterioration in photo electric cell or other parts of the circuit.

Referring to the drawings:

Figure I shows a front vertical elevation partly in section of one form of my device, while Figure II shows a side vertical elevation also partly in section. The form of my invention shown on Figures I and II may be readily applied to measuring or controlling the characteristics of fluids and particularly liquids.

Figure III shows a modification of my device adapted to measure or control solids such as strips or sheets.

Figure IV shows a modification of my device as applied to measure or control the characteristics of materials by means of light reflected from the surface.

Figure V shows diagrammatically a typical circuit as applied to the various forms of my invention, particularly that illustrated in Figures I and II.

Figure VI shows diagrammatically the relations of light intensity and current produced by the phases of generator 10.

Figure VII shows a plan view partly in section of one form of my device as modified for the measurement or control of gases, vapors or liquids.

Figure VIII shows a vertical elevation partly in section of the device illustrated in Figure VII. The construction shown diagrammatically in Figures VII and VIII may be well applied to a control of smoke, etc.

Figure IX shows diagrammatically a further modification of a circuit applicable to my invention, as for example the arrangement shown in Figures VII and VIII.

Referring to the drawings, Figures I and II show an assembly of practical working units embodying one form of my invention. In these figures 1 indicates a base or support carrying a series of upright rods 2, 3, 4 and 5 which in turn serve to support floor or deck 6 and cover 7. A motor 8 is mounted on deck 6 and carries on its shaft rotating member 9 which in turn couples motor 8 to generator 10. Generator 10 may be considered as similar to the conventional alternating current generators with the exception that a commutator is provided to cut out half of each complete cycle giving the curve as indicated in Figure VI, of the drawings. The number of poles of the generator are so chosen that one complete cycle corresponds to the timing of each light impulse on the photo electric cell.

Rotating member 9 is designed to permit light from source 11 to pass alternately through tubes 12 and 13. For purposes of convenience of form, rotating member 9 forms a light shell or tube 14 enclosed on the motor end by plate 15 and the generator end by plate 16. Tube 14 is provided with two series of holes indicated respectively by 17 and 18. The series of holes 17 are staggered circumferentially in respect to the series of holes 18 and arranged to permit light from source 11 to pass through some of the holes in series 17 and then through tube 13. During this period none of the holes in series 18 are in position to permit light to pass from source 11 through tube 12. As member 9 rotates the holes in series 17 move out of line with the light source and tube 13, while holes in the series 18 move into line with the light source and tube 12, thus permitting light from the source 11 to alternately pass first through tube 13 then through tube 12 continuously.

Obviously any number of holes may be used in series 17 and 18 and the shape and size are subject to material variation depending on the details of design. Member 9, therefore, serves as a shutter and any equivalent shutter device, accomplishing a similar purpose may be employed.

Tubes 12 and 13 may be formed of bronze or similar material and are preferably arranged in a vertical position to permit elimination of air bubbles and to prevent the accumulation of sediment.

Transparent end pieces numbers 19, 20, 21 and 22 are provided to permit the passage of light through the ends of tubes 12 and 13, but to retain the fluid circulated through.

A pair of mirrors 23 and 24 are provided at the ends of tubes 12 and 13 and so arranged as to deflect the light passing through these tubes upon photo electric cell 25, which is shown diagrammatically supported on base 1.

Photo electric cell 25 is connected as will be later shown and described to amplifier tubes 26 and 27 mounted on sub-base 28. A transformer 29 is shown to provide a low voltage current for light source 11 and the filaments of amplifier tubes 26 and 27. A "B" eliminator or equivalent source of relatively high voltage current is indicated by 30. This is used as will be later shown and described in the wiring diagram. A relay 31 is mounted on sub-base 28 and arranged to operate the control mechanism as shown on the circuit diagram in Figure V.

Referring to Figure III the principal objects of the equipment are as shown diagrammatically in Figures I and II with the exception of the tubes 12 and 13. A comparison slide 32 is substituted in place of tube 12 while a sample of the material being compared is substituted for tube 13 and indicated by numeral 33. In Figure IV numerals similar to those used in Figures I and II indicate equivalent portions of my device. In this case, however, the portion indicated by 34 represents diagrammatically a comparison or standard while 35 indicates the article measured or controlled. 36 represents a light shield or cover over photo electric cell 25. In the drawings, the solid lines represent the direction of travel of light under the conditions shown, while the dotted lines indicate the succeeding path of the light rays.

In Figure V a typical circuit showing one form of my invention is disclosed. In the diagram numbers corresponding to those previously used refer to similar pieces of equipment. In the diagram 11 represents a light source whereupon light is passed through the series of holes 17 and 18 in rotating member 9, driven by motor 8 which in turn drives generator 10. The light rays travel successively from source 11 through the opening 17 and 18 and then through standard tube 12 and comparison tube 13, being reflected by mirrors 23 and 24 respectively to photo electric cell 25. 37 represents a pump or other device arranged for moving the fluid used as a standard. Pump 37 passes liquid from container 38 through control valve 39 into tube 12. Fluid then passes through control valve 40 and duct 41 back to container 38. In a similar manner stock chest 42 or other source of fluid to be controlled or measured delivers a fluid to control valve 43 and duct 44 to tube 13. The fluid leaves tube 13 by means of control valve 45 and duct 46. The fluids then pass into container 47 from whence they may be conducted to the waste or back into the system.

Container 42 is supplied with additional fluid from container 48 through hand control valve 49 and automatic control valve 50. An additional source of fluid is also delivered as required from container 51 through hand control valve 52 and automatic control valve 53. Automatic valves 50 and 53 are connected for operation from relay member 54 in a manner later to be described.

The current which passes through photo electric cell 25 under the influence of the light rays passes between grid 55 and filament 56 of amplifier tube 57. A typical B battery circuit is indicated by 58 with potentiometer bias indicated by 59. Plate 60 of amplifier tube 57 is connected in the usual manner to grids 61 and 62 of relay tubes 63 and 64 respectively.

The filaments 65 and 66 of tubes 63 and 64 are excited from two windings of generator 10 in a sequence illustrated in Figure VI to be described later. Control of the current flowing in filaments 65 and 66 is provided by the rheostats 67 and 68, respectively.

Plates 69 and 70 of relay tubes 63 and 64 are connected respectively to coils 71 and 72 of relay 54, while the neutral point of coils 71 and 72 or common lead is connected through B battery 73 to the common point of filaments 65 and 66.

An armature 74 is pivoted as indicated at 75 above coils 71 and 72 which are provided with cores 76 and 77 respectively. The stationary contacts 78 and 79 of relay 54 are arranged to control the current flowing through automatic valves 50 and 53, thus controlling the discharge of fluid from containers 48 and 51 into container 42. The return lead 80 from control valves 50 and 53 connects to a power circuit or other source of current 81 and passes to moving contact 82 of relay 54.

Referring to Figure VI, I—I and II—II are common base lines. Curve 83A indicates the intensity of light reaching the photo electric cell through one of the tubes as for example #12, while curve 84A drawn with respect to base line II—II represents the intensity of light passing through the other tube, as for example 13. The point marked zero in each of these curves indicates the same instant of time.

Curve 85A indicates diagrammatically the quantity of current passing through the filament of one of the relay tubes as for example 63, while curve 86A represents the quantity of current passing through filament 66 of relay tube 64. It will be noted that current represented by curve 85 is derived from circuit 87 and 88 of generator 10 while the current indicated by curve 86A is generated by circuit 88 and 89 of generator 10.

Base lines I—I and II—II are separated for purposes of clearness, but it could be assumed that they represent the same line.

It will be noted that generator 10 is rigidly connected to motor 8 and to light shutter 9. It will be apparent, therefore, from curve 6 and the description given in Figure V that as motor 8 revolves light rays are passed alternately through tubes 12 and 13, and at the same time, filaments 65 and 66 of relay tubes 63 and 64 are synchronously energized. Since no current can pass from the plates 69 and 70 of relay tubes 63 and 64 until the filaments are energized, this arrangement automatically directs the current control by the flow of light through tubes 12 and 13 to winding 71 or 72 of relay 54.

For example, when light is passing through tube 12 the resultant amplified photo electric current will pass through coils 71 of relay 54 and conversely when light is passing through tube 13, the resultant amplified photo electric current will pass through coil 72. Since these currents will be pulsating (that is to say unidirectional) armature 74 will move in the direction of the coil having the stronger pull. For example if the light passing through tube 12 is more intense than that passing through 13, coil 71 will exert the stronger pull on armature 74 than will coil 72. This will move armature 74 in such a manner as to close contact between the points 82 and 79, thus operating automatic control valve 53 and delivering fluid from container 51 into container 42.

Thus for example, if we assume container 42 holds a solution which is being controlled and which is, therefore, passing through tube 13, and if such solution is too dense, owing to too great a concentration thus causing tube 13 to offer more resistance to light flow than the standard solution passing through tube 12, the operation of the equipment will be such as to deliver more diluting material, as for example water from container 51 thus bringing the opaqueness or density of the material in container 42 back to the standard. On the other hand, in case the material in container 42 becomes too thin and, therefore, less opaque than the standard in container 38, the action of the photo electric currents when amplified will be to close the contacts between terminals 78 and 82, thus operating control valve 50, and adding more of the opaque material to container 42.

Referring to Figures VII and VIII numbers previously assigned to similar parts of the equipment apply in this case. Thus light source 11 is arranged to direct a beam of rays alternately through standard tube 83 and comparison tube 84. This deflection of the light ray is controlled by rotating member 9 driven by motor 8. A transformer 29 may be used to supply a low voltage current to light source 11 and the filament of amplifier tubes 26 and 27.

The light rays after passing through the two tubes are reflected by mirrors 23 and 24 to photo electric cell 25. A relay 31 and "B" eliminator 30 or equivalent are included as in former cases. For mechanical convenience motor 8 and light source 11 are mounted on a base 85 which also carries support 86 for the standard tube 83 and comparison tube 84. A housing 87 preferably ventilated, encloses the motor and rotating device.

A base 88 supports vertical members 89, 90, 91 and 92 which in turn carry shelf 93. Shelf 93 supports amplifier tubes 26 and 27 and photo electric cell 25 as well as mirrors 23 and 24.

A housing 94 encloses this equipment and makes a tight seal with base 88.

A duct or stack 95 carries the gases or fluids which are to be measured or controlled. Standard tube 83 passes continuously through duct 95 and serves as the standard or comparison for the beam of light. Comparison tube 84 is broken off in the center, but has both ends closed by transparent plates 96 and 97 respectively. The ray of light, therefore, passes first through a tube containing clear normal air and then through a given length of the duct containing the material to be measured. The difference in the transparency of the two media may be used to operate a damper 98 or other device admitting or controlling air, etc.

In Figure IX a typical circuit connecting the apparatus above described is shown. In place of the relay tubes illustrated in the former circuit, a commutator member 99 consisting of brushes 100 and 101 is mounted rigidly on the shaft of motor 8 and rotating member 9. The brushes 100 and 101 of commutator 99 are arranged to make contact in such a manner that when the light is going through one of the tubes, as for example 83, amplified photo electric current is directed through winding 102 of relay 31, while when the ray of light is passed through the other tube, as for example 84, the amplified resultant photo electric current is directed through winding 103 of relay 31. This serves, in the manner previously outlined, to actuate a motor valve 104 which in turn moves lever or other equivalent device 105, thus turning damper 38 and adjusting the draft. For purposes of illustration, motor device 104 consists of coils 106 and 107 arranged to be actuated respectively by relay windings 103 and 102. If desired a counterweight 108 may be used to lessen the work done by the motor device.

It will be understood that the damper shown diagrammatically may be placed in any part of the circuit. For example, the damper shown may effect the draft by being in the discharge of the stack or it may open or close a door or port in the air intake of a furnace either above or below the grate. These devices depend on the type of furnace and its method of operation and my invention is not restricted to any particular arrangement of this portion of the equipment.

It is well known that all attempts thus far to commercially utilize photo electric cells have met with failure or only indifferent success wherever a marginal operation has been required. This is because there are many variables which may under some conditions, cause greater change in the action of the cell than the factors which it is desired to measure or control.

For example, a change of a fraction of one percent in the voltage applied to the light source (assuming an incandescent lamp) will cause very serious differences in the reading of the photo electric current. In addition the photo electric cell is subject to continuous change and depreciation which means that readings taken over an interval of time would vary widely, even though the exciting conditions remain the same. Such factors as the change in light transmission of glass lenses and plates the variation in the effect of amplifier tubes and many other factors all combine to render previous methods of using photo electric cells rather inaccurate and in general unsatisfactory.

It will be apparent that I have eliminated these variables by dividing the beam of light into portions and continuously comparing the effect of the beam of light on the cell after passing through a standard light circuit, with that produced after passing through the light circuit being measured or controlled.

Since the difference of the readings is taken in each case the variables in the equation are cancelled and the resultant is a true indication or measurement substantially independent of the factors outlined above.

It will be apparent that the system described in this specification and claimed below should not be restricted to the exact mechanical arrangement of parts or the shape, sizes or designs shown and specified. The well known substitutes for various portions of equipment may be used without departing from the spirit of my invention.

Thus in alternately interrupting the light circuit I may use a shutter or vibrating mechanism instead of a rotating member. As a light source I may use an arc, an incandescent lamp or other suitable illuminants. I may if desired, replace my standard tube by a slide or plate which may be stained or colored in any predetermined manner. In place of mirrors I may arrange the photo electric cell in such a manner that one set of rays strike it directly and the second set are reflected upon it. Various types of photo electric cells may be employed, as I do not wish to restrict this invention to any particular type. The type shown diagrammatically is only one form of many which may be applied to this invention. A change in the type of photo electric cell will obviously cause various well known changes in the circuits connected therewith.

I have shown for purposes of illustration, a conventional type of relay, but do not restrict myself to the construction here shown as to relay, actuating devices and other details.

It should be understood that where I have referred to "B" eliminators or batteries a transformer or other suitable source of electrical energy may be substituted making the necessary changes which are familiar to those skilled in the art.

It should also be understood that in referring to tubes I do not wish to be confined to any particular shape or structure as obviously any form of container may be employed thus tanks, vats, ducts, etc., may be used with equal success.

I do not wish to be limited to any amount of voltage or current as obviously these conditions vary with the equipment and circuit.

I have found it particularly convenient in setting up my equipment to obtain a balance or setting between the two light circuits. This balance may be obtained either optically as for example by adding a screen or plate 32 in the light circuit passing through the comparison tube. This may be used to balance the two circuits and obtain an adjustment such that the relay 54 would be in neutral position. On the other hand, in some cases the equivalent balance may be obtainable more readily by the use of one or more rheostats as for example, those indicated by 111 and 112 Figure V. Obviously by adjusting the resistance in series with coils 71 and 72 respectively, the relay 54 may be maintained in any desired balance independent of the relative intensity of light passing through the standard tube and the comparison tube.

One feature of my invention, therefore, which adds materially to its practicability as to the ability to balance the resultant photo electric circuits either optically or electrically.

Having now fully described my invention what I claim as new and wish to secure by Letters Patent in the United States, is as follows:

1. In a system for testing and/or controlling the production of a material, the combination of a standard and a sample of the material, a single light source, a light sensitive cell, means for alternately directing the beam of light from said source to said sample and to said standard and upon the light sensitive cell, a plurality of amplifiers connected to said cell, means for alternately energizing said amplifiers, means for operating said energizing means and said light-directing means in synchronism so that one amplifier is only responsive to the impulses generated by the light directed to the sample and the other amplifier is only responsive to the impulses generated by the light directed to the standard, and means connected to said amplifier for controlling the production of said material in accordance with the relative intensities of the amplified impulses.

2. In a system for testing and/or controlling the production of a material, the combination of a standard and a sample of the material, a single source of light, a light sensitive cell, means for alternately directing the beam of light to said sample and then to said light sensitive cell and to said standard and then to said light sensitive cell, a plurality of electron relays connected to said cell, means for alternately energizing said relays, means for operating said energizing means and said light directing means in synchronism so that one relay is only responsive to the impulses generated by the light directed to the sample and the other relay is only responsive to the impulses generated by the light directed to the standard, and means connected to said relays for controlling the production of said material in accordance with the relative intensities of the relayed impulses.

3. In a system for testing and controlling the production of a material, the combination of a standard and a sample of the material, a single source of light, a light sensitive cell, means for alternately directing the beam of light from said source through said sample and through said standard and upon the light sensitive cell, a plurality of amplifiers connected to said cell, means for alternately energizing some of said amplifiers, means for operating said energizing means and said light directing means in synchronism so that one amplifier is only responsive to the impulses generated by the light directed through the sample and the other amplifier is only responsive to the impulses generated by the light directed through the standard and means connected to said amplifiers for controlling the production of said material in accordance with the relative intensities of the amplified impulses.

WILLIAM A. DARRAH.